United States Patent
Lambert et al.

(10) Patent No.: US 9,363,249 B2
(45) Date of Patent: Jun. 7, 2016

(54) SECURE SIMPLE ENROLLMENT

(71) Applicant: MARVELL WORLD TRADE LTD., St. Michael (BB)

(72) Inventors: Paul A. Lambert, Mountain View, CA (US); Josselin De La Broise, Mountain View, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 27 days.

(21) Appl. No.: 14/198,994

(22) Filed: Mar. 6, 2014

(65) Prior Publication Data
US 2014/0258724 A1 Sep. 11, 2014

Related U.S. Application Data

(60) Provisional application No. 61/842,613, filed on Jul. 3, 2013, provisional application No. 61/773,317, filed on Mar. 6, 2013.

(51) Int. Cl.
| | |
|---|---|
| *H04L 29/06* | (2006.01) |
| *H04L 9/32* | (2006.01) |
| *H04W 12/04* | (2009.01) |
| *H04W 12/06* | (2009.01) |

(52) U.S. Cl.
CPC ............ *H04L 63/062* (2013.01); *H04L 9/3244* (2013.01); *H04L 63/0442* (2013.01); *H04W 12/04* (2013.01); *H04W 12/06* (2013.01)

(58) Field of Classification Search
CPC . H04L 63/062; H04L 9/3244; H04L 63/0442; H04W 12/06; H04W 12/04
See application file for complete search history.

(56) References Cited

U.S. PATENT DOCUMENTS

| | | | |
|---|---|---|---|
| 7,499,548 | B2 | 3/2009 | Meandzija et al. |
| 8,694,782 | B2 | 4/2014 | Lambert |

(Continued)

FOREIGN PATENT DOCUMENTS

WO   WO2013023968 A1 *  2/2013  .............. H04L 29/06

OTHER PUBLICATIONS

Invitation to Pay Additional Fees and Partial International Search Report in corresponding PCT Application No. PCT/US2014/021295, dated Aug. 13, 2014 (5 pages).

(Continued)

*Primary Examiner* — Tae Kim
*Assistant Examiner* — Shu Chun Gao

(57) ABSTRACT

Methods, systems, and apparatus are disclosed for generating one or more device identifiers based on a public key associated with a respective device. Various embodiments include condensing and/or hashing a device public key to generate the corresponding device identifier. By using the relationship between a device public key and its device identifier, public key exchanges are implemented to verify this relationship and facilitate device enrollment into one or more networks. The embodiments further describe enrolling one or more devices into networks and/or authorizing devices to enroll one more devices into networks based on public key exchanges and verification that the one or more device identifiers match the respective public keys. Embodiments for authorizing other devices describe a first device enrolling a second device in a first network and authorizing a third device to enroll the second device in a second network using an exchange of public keys and/or messages.

16 Claims, 6 Drawing Sheets

(56) References Cited

U.S. PATENT DOCUMENTS

| | | | |
|---|---|---|---|
| 2004/0264699 A1 | 12/2004 | Meandzija et al. | |
| 2012/0284517 A1* | 11/2012 | Lambert | 713/169 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

IEEE Std 802.Nov. 2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std P802.11ad/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, pp. 1-601 (Sep. 2011).

IEEE Std 802.11adTM/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11ah $^{TM}$/D1.0 "Draft STANDARD for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE Std 802.11 $^{TM}$ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11v $^{TM}$/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, 426 pages (Aug. 2010).

IEEE Std 802.16/2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

Chen, "Home Network Basis: Transmission Environments and Wired/Wireless Protocols," *Prentice Hall*, pp. 1-26 (Jul. 2003).

Harada, "Project: IEEE P802.15 Working Group for Wireless Personal Area Network (WPANs)," IEEE 802.15-07-0693-003c, slides 24-33 (May 2007).

Hiertz, et al., "The IEEE 802.11 Universe," *IEEE Communications Magazine*, pp. 62-70, (Jan. 2010).

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Robinson, et al., "Wi-Fi Siimple Configuration Protocol and Usability Best Practices for the Wi-Fi Protected Setup™ Program," *Wi-Fi Alliance*, Version 2.0.1, 30 pages (Apr. 2011).

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250 (Nov. 4, 2004).

"Wi-Fi Peer-to-Peer (P2P) Technical Specification, Version 1.00", Wi-Fi Alliance, pp. 1-135 (Dec. 1, 2009).

International Search Report and Written Opinion in International Application No. PCT/US2014/0211295, dated Nov. 24, 2014 (16 pages).

U.S. Appl. No. 14/156,286, filed Jan. 15, 2014.

International Preliminary Report on Patentability in International Application No. PCT/US14/21295, dated Sep. 17, 2015 (12 pages).

\* cited by examiner

SECURE SIMPLE ENROLLMENT

CROSS-REFERENCES TO RELATED APPLICATIONS

This application claims the benefit of U.S. Provisional Patent Application No. 61/773,317, entitled "Simple Secure Enrollment," and filed on Mar. 6, 2013, and U.S. Provisional Application No. 61/842,613 entitled "Wi-Fi Secure Setup Enhancements for P2P," and filed Jul. 3, 2013, the disclosures of which are incorporated herein by reference in their entireties.

FIELD OF THE DISCLOSURE

The present disclosure relates generally to communication networks and, more particularly, to enrollment of devices in communication networks.

BACKGROUND

Wired and wireless networks are now commonly used to provide connectivity and network services, such as connectivity to the Internet, for example, to connected devices. Wireless networks include Wi-Fi networks, for example, such as the Institute for Electrical and Electronics Engineers (IEEE) 802.11a, 802.11b, 802.11n or 802.11ac networks. In addition to providing network connectivity to computing devices such as laptop computers and smartphones, these networks can provide connectivity to various "smart" devices, such as thermostats, water heaters, light control units, etc. To gain access to the network, a new device generally must first be "provisioned" or "enrolled" in the network, generally through a device that is already connected to the network. Enrollment is a process by which a network-enabled device obtains network credentials that enable a secure connection to the network. As just one example, if a Wi-Fi-enabled smartphone is enrolled to a network via an access point (AP), the smartphone can then connect to the network to upload and download data via the Wi-Fi connection.

For conventional wireless networks, a user typically must perform various actions to provision a device. A first technique, known as "Wi-Fi Protected Setup" or "WPS," may be used if both the AP of the network and the device to be enrolled support WPS-based enrollment. With WPS, a user must physically press a button on both the AP and the device. The two buttons must generally be pressed within a time window, which may be inconvenient when the AP and the device are not in close proximity. Moreover, the button on the device to be provisioned/connected may not be easily accessible (e.g., if the device is a water heater).

A second, PIN-based technique, may also be used. With PIN-based techniques, an alphanumeric PIN code is typically printed or displayed on the AP, which is generally programmed into the AP at the time of manufacture. A user enters the PIN code via a user interface of the device to be enrolled. The AP and the device communicate to authenticate, enroll, and connect the device to the network. But PIN codes may not be simple to use or provide a secure means of enrollment. For example, the device to be enrolled may not have a user interface that provides a convenient method of entering these characters.

Furthermore, since the PIN code typically cannot be changed, anyone who obtains the PIN code can then gain access to the network via the AP, leaving the network prone to access from unauthorized users. Moreover, the PIN code may consist of only a few alphanumeric characters (e.g., 8 or 16) and as a result, PIN code enrollment processes are prone to "brute force" attacks, or repeated attempts to guess the PIN code, thereby gaining unauthorized access to the network. In addition, although devices to be enrolled in a network can be authenticated via unique MAC addresses, such authentication procedures are prone to "spoofing" attacks, since MAC addresses can be copied to another device, which is then authorized and the network potentially subverted. Therefore, providing enrollment processes that are both simple and secure presents several challenges.

SUMMARY

Methods, systems, and apparatus are disclosed for generating one or more device identifiers based on a public key associated with a respective device. Various embodiments include condensing and/or hashing a device public key to generate the corresponding device identifier. By using the relationship between a device public key and its device identifier, public key exchanges are implemented to verify this relationship and facilitate device enrollment into one or more networks. Since the enrollment is linked to authentication procedures implementing public key exchanges, the format of the device identifier can be simplified and/or reformatted without sacrificing device and/or network security. A simplified device identifier, which may also be represented as an image, provides a user with a simpler and more secure means of enrollment of an associated device compared to the use of longer alphanumeric PINs or other WPS methods for enrollment.

In an embodiment, a first device having a first public key receives an identifier associated with the first device from a second device, and a second public key associated with the second device. The first embodiment further includes the first device authenticating the second device using the first public key and the second public key, determining whether the identifier received from the second device corresponds to the first public key, and enrolling the second device in a network including the first device based on the first device determining that the identifier received from the second device corresponds to the first public key.

In another embodiment, a first device includes a network interface configured to receive (i) an identifier associated with the first device, the identifier received from a second device, and (ii) a second public key associated with the second device and a controller. The second embodiment further includes the controller being configured to (i) authenticate the second device using a first public key associated with the first device and the second public key, (ii) determine whether the identifier received from the second device corresponds to the first public key, and (iii) enroll the second device in a network including the first device based on based on determining that the identifier received from the second device corresponds to the first public key.

In yet another embodiment, a first device having a first public key receives an identifier associated with a second device and a second public key associated with the second device. Furthermore, the third embodiment includes the first device sending the identifier to the second device, authenticating the second device using the first public key and the second public key, and receiving a notification from the second device that the identifier sent to the second device corresponds to the second public key. Finally, the third embodiment includes the first device enrolling the second device in a first network including the first device based on receiving the notification, and authorizing a third device to enroll the second device in a second network including the first device and the third device after the second device is enrolled in the first network.

BRIEF DESCRIPTION OF THE DRAWINGS

Like reference numbers in the various drawings indicate like elements.

DETAILED DESCRIPTION

Figure 1:
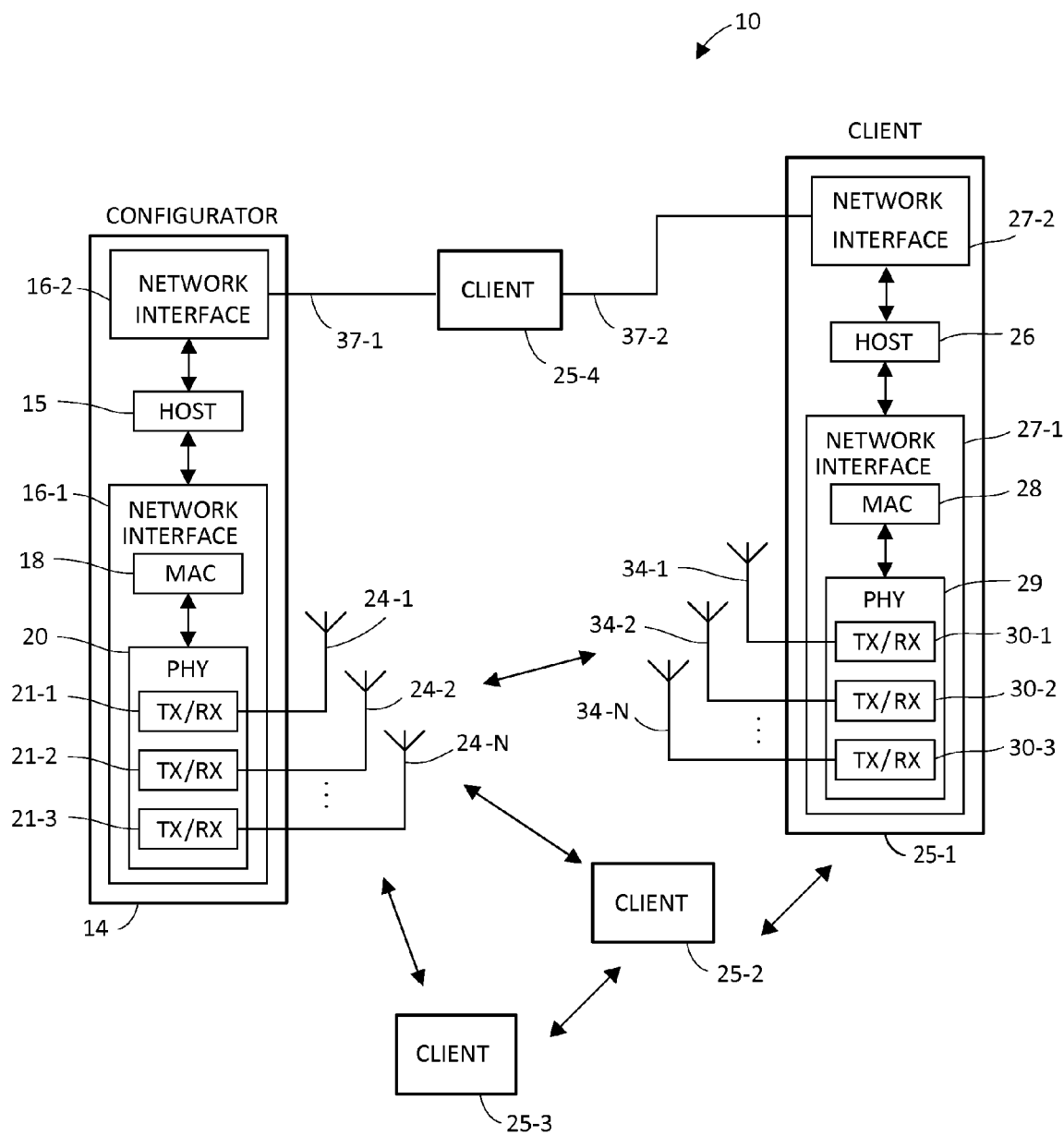
FIG. 1 is a block diagram of an example network 10 in which one or more communication devices utilize enrollment techniques in accordance with various embodiments of the present disclosure.

FIG. 1 is a block diagram of an example network 10 in which one or more communication devices utilize enrollment techniques in accordance with various embodiments of the present disclosure.

Network 10 includes a configurator 14. Although one configurator 14 is illustrated in FIG. 1, various embodiments of network 10 include any suitable number (e.g., 1, 2, 3, 5, 6, etc.) of configurators 14. Configurator 14 includes a host processor 15 that is coupled to a network interface 16-1 and/or to network interface 16-2. Network interface 16-1 includes a medium access control (MAC) unit 18 and a physical layer (PHY) unit 20. PHY unit 20 includes a plurality of transceivers 21. Transceivers 21 are coupled to a plurality of antennas 24. As will be appreciated by those of skill in the art, although three transceivers 21 and three antennas 24 are illustrated in FIG. 1, various embodiments of device 14 include any suitable number (e.g., 1, 2, 4, 5, etc.) of transceivers 21 and any suitable number (e.g., 1, 2, 4, 5, etc.) of antennas 24. Further in accordance with various embodiments, any number of transceivers 21 can be coupled to any number of antennas 24, such that one or more antennas are shared between suitable transceivers, and vice versa.

In an embodiment, network interface 16-2 has a similar structure as network interface 16-1, e.g., with a corresponding MAC unit, PHY unit, one or more transceivers and one or more antennas. In some embodiments, one or more antennas are shared by network interface 16-1 and network interface 16-2. In some embodiments, network interface 16-1 and network interface 16-2 correspond to different radio access technologies (RATs). Further in accordance with such embodiments, network interface 16-1 could correspond to a wireless RAT while network interface 16-2 corresponds to a wired network, as illustrated in FIG. 1. In accordance with embodiments in which network interface 16-2 corresponds to a wired network, network interface 16-2 includes any suitable number of suitable transceivers that are coupled to any suitable number of wired ports as opposed to of antennas, which are in turn coupled to any suitable number of network cables 37.

Network 10 includes a plurality of clients 25. Although four clients 25 are illustrated in FIG. 1, various embodiments of network 10 include any number (e.g., 1, 2, 3, 5, 6, etc.) of clients 25. A client 25-1 includes a host processor 26 coupled to a network interface 27-1 and/or to network interface 27-2. Network interface 27-1 includes a MAC processing unit 28 and a PHY processing unit 29. PHY processing unit 29 includes a plurality of transceivers 30. Transceivers 30 are coupled to a plurality of antennas 34. Although three transceivers 30 and three antennas 34 are illustrated in FIG. 1, various embodiments of client 25-1 include any suitable number (e.g., 1, 2, 4, 5, etc.) of transceivers 30 and suitable number (e.g., 1, 2, 4, 5, etc.) of antennas 34.

In an embodiment, network interface 27-2 has a similar structure as network interface 27-1, i.e., with a corresponding MAC unit, PHY unit, one or more transceivers and one or more antennas. In some embodiments, one or more antennas are shared by network interface 27-1 and network interface 27-2. In some embodiments, network interface 27-1 and network interface 27-2 correspond to different RATs. Further in accordance with such embodiments, network interface 27-1 could correspond to a wireless RAT while network interface 27-2 corresponds to a wired network, as illustrated in FIG. 1. In accordance with embodiments in which network interface 27-2 corresponds to a wired network, network interface 27-2 includes any suitable number of suitable transceivers that are coupled to any suitable number of wired ports as opposed to of antennas, which are in turn coupled to any suitable number of network cables 37.

In accordance with various embodiments of the present disclosure, any number of clients 25-2, 25-3, and 25-4 has a structure the same as or substantially similar to client 25-1. In accordance with such embodiments, clients 25 structured the same as or substantially similar to client 25-1 include any suitable number of network interfaces, transceivers, ports and/or antennas. For example, although client 25-1 is illustrated as having three transceivers 30 and antennas 34, various embodiments of client 25-2 can have two transceivers and two antennas, etc. The number of network interfaces, antennas, ports, and transceivers associated with clients 25-2, 25-3, and 25-4 is not shown in FIG. 1 for purposes of brevity.

In accordance with other embodiments, any of clients 25 has a structure the same or substantially the same as configurator 14. For example, clients 25 and configurator 14 could be the same type of devices, such as smartphones. In accordance with such an example, configurator 14 and clients 25 could differ in functionality even though their physical structure is similar. In other words, host processor 15 could implement different applications, executable instructions, and/or have permissions than the respective host processors of clients 25.

Network 10 supports communications in accordance with any number of suitable communication protocols, such as wired local area network (LAN) communication protocols specified by one or more IEEE standards, cellular protocols, wireless local area network (WLAN) communication protocols specified by one or more IEEE standards, BLUETOOTH®, WiMAX, etc. Examples of suitable wired protocols include Ethernet, Local Talk, Token Ring, Fiber Distributed Data Interface (FDDI), and/or Asynchronous Transfer mode. Examples of suitable wireless IEEE standards include 802.11a, 802.11, g, 802.11n, 802.11ac, 802.11ad, 802.11af, 802.11v, and/or 802.11ah standards.

Various embodiments of configurator 14 are configured to support any suitable type of wireless communications and are not limited to supporting only WLAN technologies. For example, various embodiments of device 14 are configured to support WLAN and/or cellular protocols such as 3rd Generation Partnership Project (3GPP) technologies including Long Term Evolution (LTE) protocols. Although FIG. 1 illustrates only a single configurator 14, various embodiments of clients 25 are configured to communicate with more than one configurator at any time, including simultaneous communications with separate configurators using communication protocols that may be the same or different from one another. In accordance with an embodiment of the present disclosure, configurator 14 and clients 25 are configured to communicate with one another conforming to one or more communication protocols and/or IEEE 802.11 standards using suitable network interfaces. In accordance with another embodiment of the present disclosure, clients 25 are configured to communicate with one another conforming to one or more communication protocols and/or IEEE 802.11 standards to support ad-hoc networking.

In accordance with various embodiments, configurator 14 and clients 25 each have an associated private key. This private key is typically programmed into the device at the time of manufacture or at another suitable time, in various embodiments. For example, the private key is programmed as a part of device firmware, a one-time programmable (OTP) memory, etc., according to various embodiments. In some embodiments, the host processor of each of configurator 14 and clients 25 is configured to generate a corresponding public key from the private key using a suitable algorithm. In other embodiments, the public key is programmed, at time of manufacture for example, into the host processor or a memory that accessible by the host processor.

As will be appreciated by those of skill in the relevant art(s), public and private keys are typically used for sending and receiving encrypted messages, decrypting messages, and/or authentication of a device as a message sender. Public keys are shared among devices within network 10, and a client 25 that requests enrollment can likewise exchange public keys with configurator 14. However, private keys are not shared among devices within network 10, nor are private keys sent or received during an enrollment process. Instead, private keys are a secure part of the corresponding device and used to decrypt messages sent using the shared public keys.

In accordance with some embodiments, any of configurator 14 and/or clients 25 has a respective device identifier that is equivalent to its public key. In accordance with other embodiments, any of configurator 14 and/or clients 25 has a respective device identifier that is based on, but not equivalent to, its respective public key. For example, the public key and device identifier may be related to one another by a truncation of the public key, a mathematical operation and/or function, a logical operator, etc.

In various embodiments, any of clients 25 are enrolled by configurator 14 to access services and/or to communicate with configurator 14 and/or other clients 25 within network 10. In accordance with such an embodiment, a user of client 25 enters a device identifier associated with configurator 14. For example, configurator 14 could be implemented as an access point (AP) and clients 25 could be implemented as station devices that communicate with configurator 14 in a basic service set (BSS). In accordance with such an embodiment, enrollment via configurator 14 could include a user entering a device identifier corresponding to configurator 14 at a client 25 that a user wishes to enroll in network 10. The configurator 14 then verifies that the public key matches the device identifier via their appropriate relationship, and if so, authenticates the client requesting enrollment. Once the client is authenticated, configurator 14 exchanges network security information with the client 25 so client 25 may complete the enrollment process. Once enrolled, configurator 14 allows the enrolled client 25 to access the network services and/or devices within network 10, such as Internet access and/or other networks that could be external to network 10 through configurator 14. Additional connections between configurator 14 and the Internet and/or to additional networks are not shown in FIG. 1 for purposes of brevity.

In other various embodiments, configurator 14 is implemented as an AP and/or a station device. For example, configurator 14 could enroll one of clients 25 to another client. That is, configurator 14 could facilitate enrollment of client 25-3 to a network including client 25-4 and client 25-1. Such an embodiment could be particularly useful, for example, when client 25-3 does not have a user interface or other convenient means in which to initiate enrollment to client 25-3 and client 25-4.

In accordance with such embodiments, a user of configurator 14 enters a device identifier associated with the client 25 requesting enrollment. Using the previous example, a user could enter a device identifier corresponding to client 25-3 at configurator 14 when a user wishes to enroll client 25-3 in network 10. In accordance with an embodiment, configurator 14 first authorizes client 25 through a key exchange. As will be appreciated by those of skill in the art, configurator 14 and a client 25 are configured to utilize any suitable key exchange method to perform this authentication, such as a Diffie-Hellman key exchange, an ephemeral key exchange, etc.

Once authenticated, in accordance with an embodiment, client 25-3 then verifies that the device identifier entered by the user matches the public key of client 25-3 via their appropriate relationship, and if so, notifies configurator 14 by sending a message to configurator 14 indicating that the device identifier entered by the user matches the public key of client 25-3 via their appropriate relationship. Once client 25-3 is authenticated and configurator 14 receives notification of the authentication, configurator 14 sends network security information to client 25-3, which client 25-3 uses to enroll client 25-3 into a part of network 10 including client 25-3 and configurator 14.

In an embodiment, once client 25-3 is enrolled, configurator 14 authorizes another client, such as client 25-4, for example, to enroll client 25-3 into another part of network 10 including client 25-4. Using this authorization, client 25-4 could send network security information to client 25-3, which client 25-3 could then use to enroll into the portion of network 10 including client 25-4. In various embodiments, enrollment of a client 25 into different parts of network 10 in this way allows for a secure environment in which each portion of network 10 allows the newly enrolled client access to different applications, services, etc. For example, the network security information provided by configurator 14 could be different than the network security information provided by client 25-4. In an embodiment, these differences could be the result of the RAT network between configurator 14 and client 25-3 being different than the RAT network between client 25-3 and client 25-4. In other embodiments, the differences in network security information is attributed to the same RATs but different network access, services, or applications granted to client 25-3 upon each respective enrollment.

In some embodiments, the device identifier is an alphanumeric character string and/or an encoded image that is printed on or displayed at the respective device. In other embodiments, the device identifier is contained within a readable memory and/or tag attached to a respective device. For example, in an embodiment in which configurator 14 is implemented as an AP, the AP could have a label printed somewhere on the AP for a user to read and enter into another device to be enrolled in network 10. Since public keys are relatively long to ensure that data is securely encrypted (e.g., 2048 bits) it may be impractical to print, display, or store the entire public key bit string on a respective device and have a user enter this bit string as part of the enrollment process.

Therefore, various embodiments include condensing the public key of the device to provide a respective device identifier. (The user interfaces, tags, and/or displays of configurator 14 and/or clients 25 are not shown in FIG. 1 for purposes of brevity.)

In other words, in some embodiments, the device identifier is the entire public key, but in other embodiments, the device identifier is generated based on or from the public key, but is a shorter alphanumeric representation thereof. For example, a binary-to-text encoding process could be utilized to provide a device identifier that is represented as a shorter alphanumeric string than the device's respective public key. More specifically, various embodiments include implementation of Base64 or Base85 encoding to reduce the public key bit string to an ASCII character string. In an embodiment in which a Base85 encoding is implemented, a 2048 bit public key bit string would be reduced to 320 ASCII characters.

However, since even a 320 ASCII character length device identifier is somewhat impractical for manual entry, various embodiments include further condensing the public key using only a portion of the public key bit string. For example, a Base85 encoding of a 64-bit public key portion would result in 10 ASCII characters. In various embodiments, the portion of the public key that is used for encoding may be taken from various portions of the public key bit string. For example, the portion of bits taken from the public key bit string could be the most significant, the least significant, or at any position within the public key bit string. As will be appreciated by those of skill in the art, the number of bits taken from the public key bit string to be encoded and represented as the device identifier may be varied based on trade-offs between a desired ease of use and the security for a particular application.

In other embodiments, the device identifier is not only a condensed representation of the public key, but is instead related to the public key of the respective device via one or more functions, which could include, for example, mathematical operations, algorithms, and/or logical operations. In accordance with such embodiments, the device identifier is not simply condensed version of the public key or a portion thereof, but rather becomes condensed through a suitable function. In an embodiment, a hash of the entire public key, or a portion thereof, is performed to generate the device identifier. For example, a host processor of a respective device could perform a secure hash algorithm (SHA) function on the respective device's public key to generate a hash-mapped output as the device identifier. Again, as will be appreciated by those of skill in the art, an implemented hash algorithm (e.g., HAS-2) and specific function (e.g., SHA-224, SHA-256, SHA-384, SHA-512, SHA-512/224, SHA-512/256, etc.) may be chosen based on trade-offs between a desired device identifier length and security for a particular application.

A typical wired equivalent privacy (WEP) PIN code used for device enrollment is limited to a fixed number of characters represented in a hexadecimal format (e.g., 8, 16, or 32 alphanumeric characters). However, because the device identifier provides a link to public key authentication, the format and length of the device identifier is less important than a typical PIN, at least in some embodiments. As a result, the format and/or length of the device identifier can be further simplified and customized for ease of use, at least in some embodiments. Therefore, in accordance with an embodiment, once an initial device identifier is obtained from a device's public key (e.g., via Base85 encoding, a SHA algorithm, etc.) another function could be applied to the initial device identifier to further simplify, map, and/or compress the initial device identifier and provide a final device identifier that is then entered by a user.

As an illustrative example, a host processor of a respective device performs a Base85 encoding on 32 bits of a public key corresponding to 0x00B3CF83, resulting in an ASCII string of "0JG17." But a user may incorrectly interpret the first ASCII string character zero as the letter "O," which would result in the client being refused Thus, in some embodiments, the respective host processor optionally applies another function on the initial device identifier ASCII string, substituting other ASCII characters for "0" and "1" such as "2" and "4," for example, resulting in a final device identifier ASCII string of "2JG47." Various embodiments include implementing a substitute mapping for other similar alphanumeric characters such as "5" and "S," "8" and "B." Other examples of substitution algorithms could include substituting all numbers with letters, all letters with numbers, etc., to provide a user with a short device identifier that reduces character ambiguity.

In accordance with various embodiments, the device identifier is not printed or displayed on a respective device, but is obtained via a registration process. For example, in accordance with an embodiment, a key separate from the public key or device identifier is linked to the respective device. Such a key could be another alphanumeric string, a serial number of the respective device, etc. When a user obtains a new device, a user could obtain the device identifier by using the supplied key and registering the respective device online, over the telephone, etc., in some embodiments. The supplied key could be supplied on a physical card shipped with the respective device, shipped separately, shipped to another person, etc., in various embodiments. By not printing the device identifier on the respective device, security can be maintained in environments in which enrollment of devices to the network is not desired or needs to be controlled.

Figure 2:
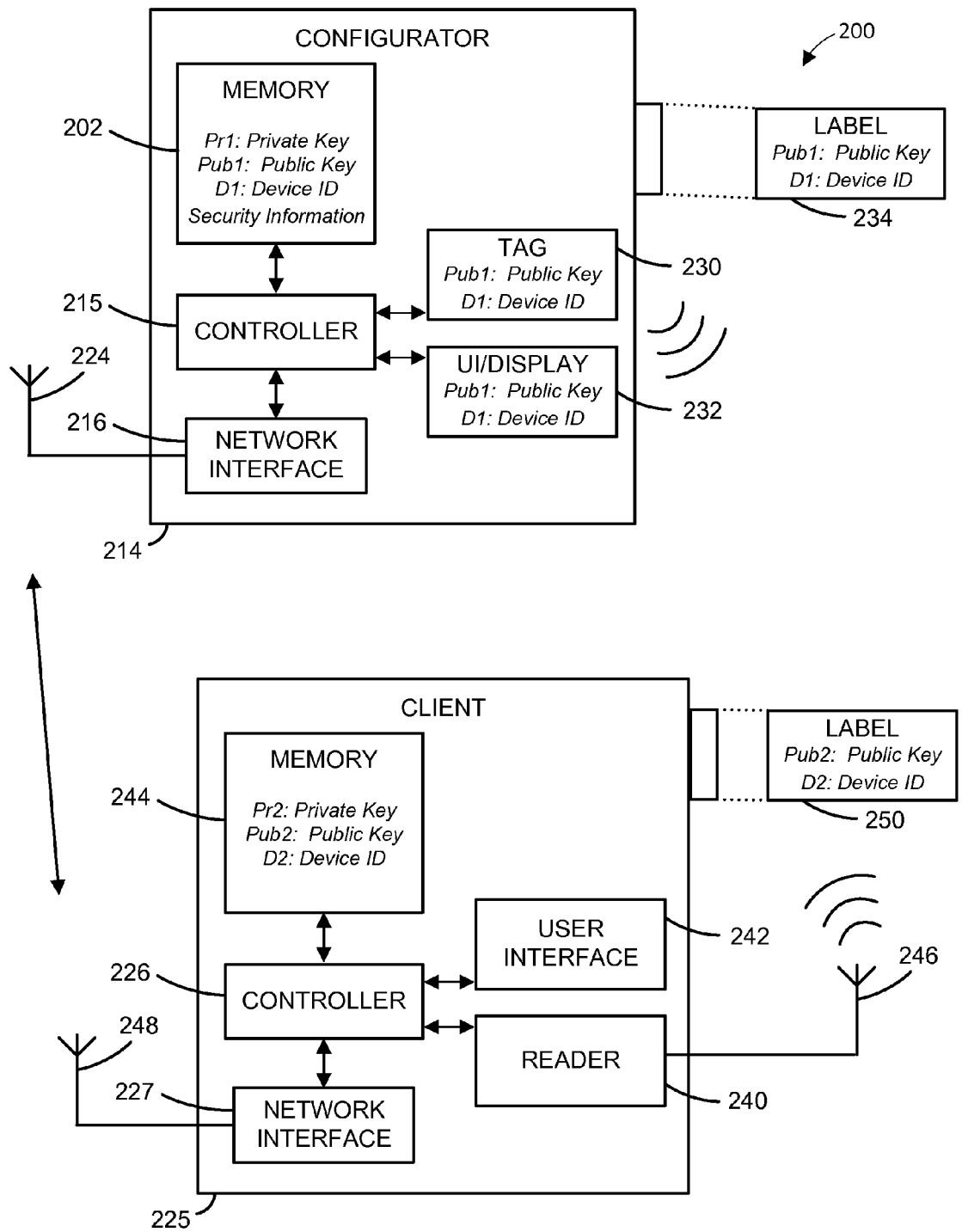
FIG. 2 is a block diagram of an example network 200, according to an embodiment.

FIG. 2 is a block diagram of an example network 200, according to an embodiment. Network 200 includes configurator 214 and client 225. In accordance with an illustrative embodiment, configurator 214 and client 225 are each an implementation of configurator 14 and client 25, respectively, as shown in FIG. 1. Further in accordance with such embodiments, network interface 216 and network interface 227 are each an implementation of network interface 16-1 and network interface 27-1, respectively. Still further in accordance with such embodiments, controller 215 and controller 226 are each an implementation of host processor 15 and host processor 26, respectively.

In accordance with an embodiment, configurator 214 includes any suitable combination of tag 230, user interface/display 232, and label 234. For example, configurator 234 could include label 234 and tag 230 while user interface/display 232 is omitted. To provide another example, configurator 14 could include only tag 230 and/or user interface/display 232 but not label 234.

Configurator 214 includes a controller 215. Controller 215 is coupled to a memory 202, a tag 230, a user interface and/or display (user interface/display) 232, and a network interface 216. In accordance with an exemplary embodiment of the present disclosure, controller 215 is a processor that executes machine readable instructions (e.g., software instructions or firmware instructions) stored in a memory device (e.g., the memory device 202 or another memory device (not shown)). In accordance with various embodiments, controller 215 communicates with network interface 216, user interface/display 232, tag 230, and/or memory 202 to exchange instructions, data, and/or to communicate with any of these respective devices. In various embodiments, controller 215 is communicatively coupled with network interface 216, user interface/display 232, tag 230, and memory 202 via one or more busses, via one or more point-to-point links, etc. In an embodiment, controller 215 processes communications sent to client 225 and received from client 225 via network interface 216 in accordance with one or more suitable communication protocols.

Controller 215 is configured to communicate with memory device 202 in order to store to and read data from the memory 202. In accordance with various embodiments of the present disclosure, memory 202 includes a volatile (e.g., a random access memory (RAM) memory device, and/or a non-volatile memory device (e.g., battery backed RAM, ROM, FLASH, etc.). As will be appreciated by those of skill in the art, various embodiments of memory 202 include different combinations of volatile and non-volatile memory devices, as well as one or multiple memory devices, implemented within configurator 214. In various embodiments of the present disclosure, memory device 202 stores machine executable instructions for execution by controller 215, private key information, public key information, device identification information, network security information, etc.

The security information stored in memory 202 includes secure network information that is sent to a device requesting enrollment once the device is authenticated. Once a device receives the security information, the device can successfully enroll in the network. The network security information typically includes a network password, key, service set identification (SSID), operating channel, etc.

In an embodiment, controller 215 is configured to generate the device ID and/or security information and store this information to memory 202. For example, as previously discussed, controller 215 could generate the device ID by performing any combination of mathematical and/or algorithmic functions on the public key. In various embodiments in which the entire public key is the device ID, controller 215 could store the device ID separate from the public key or omit storing of the device ID altogether. In an embodiment in which the device ID is not stored in memory 202, controller 215 is configured to compare a device ID from a device requesting enrollment to the public key instead of the device ID.

In other embodiments, controller 215 is configured to store to memory 202 a device ID and/or the security information that was provided from a source other than controller 215. For example, a user could obtain the device ID when configurator 214 is registered. This could include, for example, identifying configurator 214 with a unique key, serial number, etc. on a manufacturer website, which in response provides the device ID to the user. For example, a user could complete a registration procedure to obtain the device ID from another source and, once obtained, controller 215 could store this device ID to memory 202. To provide another example, a user (e.g., a network administrator) could generate and/or program memory 202 with security information via user interface, a web interface, etc., such as user interface/display 232, for example. In accordance with such an example, controller 215 facilitates storing to memory 202 the device ID D1 provided by a user.

Controller 215 is configured to communicate with tag 230 in order to store to and/or read data from tag 230. In accordance with various embodiments of the present disclosure, tag 230 includes a non-transitory, machine readable memory that is configured to store the public key and/or device identifier corresponding to configurator 214. In various embodiments, controller 215 is configured to generate the device ID from the public key and/or to store a user-supplied device ID to tag 230, as previously discussed with regards to the device ID stored in memory 202. As will be appreciated by those of skill in the art, various embodiments of tag 230 include implementation of tags configured to communicate in accordance with near field communications (NFC) and/or radio frequency identification (RFID) protocols. In various embodiments, tag 230 is implemented as an active tag or a passive tag. For example, in an embodiment, tag 230 obtains power for communicative operations from a power source implemented by configurator 214. In another illustrative embodiment, tag 230 is powered, for example, via inductive coupling with a tag reader, such as a tag reader of a client device.

In an embodiment, the public key and/or device identifier of tag 230 are programmed by a device other than controller 215. For example, tag 230 is programmed with a static device ID at time of manufacture of configurator 214 or components of configurator 214, in an embodiment. Although the device ID could later be changed in such an embodiment, such a change of the device ID does not necessarily require communications between controller 215 and tag 230 (e.g., the device ID could be changed using an external NFC reader/writer). Thus, in some embodiments, controller 215 does not need to communicate with tag 230, and the illustrated communications in FIG. 2 between controller 215 and tag 230 are omitted.

Controller 215 is configured to communicate with user interface/display 232 to display the public key and/or device ID, in some embodiments. In an embodiment, user interface/display 232 functions as both a user interface and a display. For example, in an embodiment in which configurator 214 is implemented as part of a smartphone, user interface/display 232 could also provide a user interface via an interactive display that includes a "soft" keyboard, etc. In an embodiment, controller 215 is configured to generate the device ID from the public key and to display the generated device ID on user interface/display 232. In other embodiments, controller 215 is configured to display a user-supplied device ID to user interface/display 232, as previously discussed with regards to the device ID stored in memory 202 and/or tag 230.

In other embodiments, user interface/display 232 functions as either a user interface or a display. For example, in embodiments in which configurator 214 is implemented as part of a television, user interface/display 232 could be implemented as the television screen. In various non-interactive display embodiments, the device ID displayed on user interface/display 232 could be generated by controller 215 or received from a source external to the configurator 214.

Label 234 is a physical printout of the public key and/or device ID. In an embodiment, label 234 is affixed to configurator 214, for example, as an adhesive-backed label, etc. Although FIG. 2 illustrates label 234 as being affixed to configurator 214, in other embodiments, label 234 is not affixed to configurator 234. As previously discussed, label 234 could be stored in a secure location separate from configurator 214 to provide enhanced security.

In various embodiments, the public key or device identifier could be represented as an image as opposed to an alphanumeric string. For example, label 234 and/or display 232 could represent the public key and/or device ID as a bar code or other suitable encoded image, such as a QR code, for example. In accordance with such an embodiment, a user can "scan" the barcode at a device to start the enrollment process. Encoded image embodiments could be especially useful for applications in which the entire public key (or a larger portion thereof) is desired to be used as a device identifier. Several image encoding schemes provide for encoding of several thousands of bits. For example, QR coding allows for alphanumeric modes of 4296 characters at 5.5 characters per bit for a total of 23,628 bits. As a result, image encoding embodiments not only provide an easier means for a user to enter a device identifier for enrollment, but also provide for a very secure authentication and enrollment system.

Controller 215 is configured to communicate with network interface 216 to facilitate communications between configurator 214 and client 225. Although network interface 216 is illustrated in FIG. 2 as coupled to antenna 224, various embodiments of configurator 214 include network interface 216 facilitating wired and/or wireless communications with client 225. For example, in embodiments in which network interface 216 facilitates wired communications, antenna 224 is omitted and substituted with one or more port and/or network cables, as previously discussed with reference to FIG. 1. In accordance with an embodiment, configurator 214 communicates with client 225 via network interface 216 in accordance with any suitable wired and/or wireless communication protocol to facilitate enrollment of client 225 into a network via configurator 214.

Client 225 includes a controller 226, a memory 244, a network interface 227, a reader 240, a user interface 242, an antenna 246, an antenna 248, and a label 250. In various embodiments, controller 226 is communicatively coupled with network interface 227, user interface 242, reader 240, and memory 244 via one or more busses, via one or more point-to-point links, etc. Controller 226, network interface 227, memory 204, user interface 242, and antenna 248 perform substantially similar functions are controller 215, network interface 216, memory 202, user interface/display 232, and antenna 224, respectively. Therefore, only differences between these elements will be further described.

In accordance with various embodiments, client 225 includes any suitable combination of controller 226, memory 244, user interface 242, network interface 227, reader 240, and label 250. For example, client 225 could include user interface 242 while label 250 and/or reader 240 are omitted.

Controller 226 is configured to store its own private key, public key, and/or device ID in memory 244. As previously discussed with regards to controller 215, the device ID may be generated via controller 226 or obtained via another means, such as a registration procedure, etc. Device ID D2 is not required for enrollment of client 225 into a network via configurator 214, in an embodiment. Similarly, a user does not require information from label 250 to enroll client 225 into a network including configurator 214, in an embodiment. However, various embodiments include client 225 functioning as a configurator to enroll other clients into the network once client 225 is enrolled itself. Therefore, the device ID D2 is illustrated in FIG. 2 in memory 244 and label 250 in accordance with these embodiments, which will be discussed further with reference to FIG. 3.

Controller 226 is configured to communicate with user interface 242. In various embodiments, controller 226 provides a user with a means to interact with client 225. For example, user interface could include various interactive displays, such as touch-sensitive keyboard displays, etc. In an embodiment, user interface 242 also includes links to additional applications within client 225. For example, user interface 242 could enable a user to execute an encoded image application, which uses a camera device (not shown) that is included in or coupled to client 225, for example, to scan encoded device ID images.

Controller 226 is configured to communicate with reader 240 to facilitate communications between reader 240 and tag 230 in accordance with any suitable communications protocol. In various embodiments, reader 240 is configured to communicate with tag 230 using an NFC and/or RFID protocol. In some embodiments, antenna 246 is configured to provide inductive coupling between reader 240 and tag 230 in accordance with these protocols.

In accordance with an embodiment, a user starts an enrollment procedure by entering a device ID D1 of configurator 214. In various embodiments, the device ID D1 could be entered by a user via user interface 242. For example, if the device ID D1 is an alphanumeric string of characters, a user could enter the device ID D1 from label 234 or from display 232 into user interface 242 via a keyboard. To provide another example, if the device ID D1 is represented as an encoded image on label 234 and/or display 232, a user could scan or take a picture of the encoded image instead of entering an alphanumeric code, for example, by using an image capture device included in or coupled to the client 225.

In other embodiments, a user enters the device ID D1 via reader 240. In such embodiments, a user "scans" tag 230 to obtain the device identifier. For example, a user could tap client 225 to a designated area on configurator 214 in which tag 230 is attached instead of entering an alphanumeric code via a keyboard or scanning an encoded image. In accordance with such embodiments, the device ID D1 is communicated to reader 240 via a suitable tag protocol. For example, the device ID could be communicated in accordance with an NFC data exchange format (Ndef) message.

In an embodiment, configurator 214 is configured to initially determine whether to accept newly enrolled devices. For example, if a network includes multiple configurator devices, a network administrator could configure a single configurator to accept new enrollments and configure all configurators to ignore new enrollment requests. The following enrollment acts are provided assuming that configurator 214 has been configured to accept new enrollments once a device is authorized.

Once client 225 receives the device ID D1, client 225 sends a message to configurator 214 requesting public key Pub2 via network interface 227. In an embodiment, this information could be exchanged as part of a protocol data unit conforming to a wired or wireless data protocol, such as Wi-Fi, for example. Once configurator 214 receives this message via network interface 216, it responds by sending client 225 its own public key Pub1.

Once configurator 214 and client 225 exchange their public keys Pub1 and Pub2, both configurator 214 and client 225 create a session key from a combination of Pub1 and Pub2 via their respective controllers. As will be appreciated by those of skill in the art, this key exchange and session key creation procedure can be performed in accordance with any suitable key exchange procedure, such as a Diffie-Hillman key exchange, an ephemeral key exchange, etc. As will further be appreciated by those of skill in the art, the mathematical relationship between public keys Pub1 and Pub2 and their respective private keys Pr1 and Pr2 allows for secure encrypted communications between configurator 214 and client 225 using this session key. In other words, although the session keys are created using a combination of public keys, a message encrypted with the session key can only be decrypted at either device with the respective private keys Pr1 and Pr2. In this way, the use of session keys provide security at various network layers during communication between configurator 214 and client 225.

The session key created at the client 225 is then used to authenticate client 225. More specifically, client 225 generates one or more authentication test messages encrypted with the session key and sends these authentication messages to configurator 214. Once configurator 214 receives the encrypted authentication message, configurator 214 decrypts the authentication message with the session key using the private key Pr1. As will be appreciated by those of skill in the art, configurator 214 determines whether the decrypted message corresponds to a predetermined format expected. If the decrypted authentication message does not correspond to the expected predetermined format, configurator 214 stops the enrollment procedure as client 225 is determined to be not authenticated. On the other hand, if configurator 214 determines that the decrypted authentication message corresponds to the expected predetermined format, then configurator 214 generates an acknowledgment message, encrypts the acknowledgment message with the session key, and sends the acknowledgement message to client 225.

When client 225 receives the encrypted acknowledgement message, client 225 similarly decrypts the acknowledgement message with the private key Pr2 and determines whether the decrypted message is valid. If it is determined that the decrypted acknowledgment message is valid, then client 225 verifies that client 225 has been properly authenticated and proceeds to request enrollment by sending the device ID D1 to configurator 214.

At this stage, configurator 214 has verified that the enrollment request is from an authenticated device, which is client 225. In an embodiment, configurator 214 determines that the enrollment request is from an authenticated device since only devices having the proper respective private keys capable of decrypting messages sent using the session key will result in authentication. In other words, another device can attempt to create a session key using Pub1 and Pub2 (since they are not secure) and send an enrollment request to configurator 214 posing as client 225, for example, by cloning a MAC address of client 225, etc. (spoofing attack). But since this spoofing device does not have access to private key Pr2, any messages encrypted with the session key and sent by configurator 214 cannot be decrypted by the spoofing device. In other words, since authentication requires verification by both devices, a spoofing device cannot be authenticated simply by posing as another device and using a public key of that device.

Therefore, although the device ID can be maintained in a secure environment if desired, doing so is not as critical as compared to traditional uses of a PIN code or passphrase, at least in some embodiments. In other words, in contrast to a PIN device, the identifier value itself does not guarantee automatic enrollment between two devices, since the enrollment process initially uses authorization procedures based on a public key exchange, at least in some embodiments.

Once configurator 214 receives the device ID D1 from (now authenticated) client 225, configurator 214 verifies that the received device ID D1 is correct, e.g., matches a device ID D1 stored in memory 202, corresponds to some other value stored in memory 202, etc. For example, in an embodiment in which a hashing function is used to generate device ID D1, controller 215 could rehash public key Pub1, for example, and verify that the rehashed public key Pub1 matches the device ID received from client 225. In other embodiments in which condensing algorithms, substituting algorithms, etc., are used to generate the device ID, controller 215 could reverse these algorithms on the received device ID, or reapply the algorithms to the public key Pub1 stored in memory 202 to determine whether they correspond.

If the received device ID is not correct, then configurator 202 rejects the enrollment. In various embodiments, a limited number of attempts could be established for consecutive or overall rejections within a set period of time. For example, controller 215 could establish an access control list and/or a "lockout" that prevents enrollment from this device for some established period of time, until configurator 214 is reset, etc., regardless of whether future device ID information is correct. In this way, the threat of brute force attacks can be mitigated.

Once controller 215 verifies that the device ID is correct, configurator 214 sends the security information to client 225. Once client 225 receives the security information, client 225 sends the security information back to configurator 214 as part of an enrollment request. In various embodiments, the security information is exchanged between configurator 214 and client 225 either encrypted with the session key or unencrypted). Once configurator 214 receives the proper network security information and the enrollment request from authenticated client 225, client 225 is enrolled in the network via configurator 214.

In an embodiment, controller 215 is configured to update the device ID stored in memory 202 (and/or a value that corresponds to device ID, e.g., that is used to generate the device ID), in tag 230, and/or displayed via display 232 at any time. Further in accordance with such an embodiment, controller 215 can be configured to change device ID D1 (and/or the value that corresponds to device ID) once enrollment of client 225 has been completed (or some other number of devices) to prevent additional devices from enrolling with the old device ID. Such embodiments can be particularly useful, for example, when tag 230 or display 232 are used as opposed to label 234, since such devices lend themselves well to dynamic device IDs. In some embodiments, controller 215 is configured to execute several device ID generation algorithms that each generate different device IDs when performed on the public key.

In various embodiments, configurator 214 keeps track of any devices that may or may not be enrolled as part of an access control list, a blacklist, etc. In accordance with various embodiments, configurator 214 only allows a client to enroll once it is confirmed that the client is on an inclusive access list, is not on an exclusive blacklist, etc. For example, controller 215 can store an access control list and/or a blacklist in memory device 202. The access control list can be generated and modified via controller 215 and/or user entry. For example, a user may decide to select only certain signed public keys authorized for enrollment into the network. In an embodiment, this access control list supersedes procedures that would otherwise result in the successful authentication and enrollment of a client.

In various embodiments, the session key and/or authenticated device list are used to easily enroll a device that was previously authenticated and/or enrolled. For example, controller 215 could generate an access control list including the device ID and its corresponding public key, session key and/or authentication state once a respective client is authenticated and/or enrolled. Continuing this example, controller 215 could then quickly enroll a client that is reset, disconnected, powered off and back on, etc., using this access control list. In an embodiment, controller 215 does not re-authenticate devices once they have been authenticated and enrolled if these devices later require re-enrollment. For example, since the public key and device ID of client 225 can be received by configurator 214 and are not protected, configurator 214 can simply compare these values to the access control list and determine that the device corresponding to these values has already been authenticated. Upon re-enrollment, controller 215 can skip authentication of client 225 if the access control list indicates this has already been performed.

To provide another example, controller 215 could compare the session key to a previously authenticated session key and skip authentication. In other words, if the session key matches a previously authenticated session key stored in the access control list for a respective client, controller 215 can quickly authenticate the client corresponding to this session key upon re-enrollment. That is, once authentication begins and a session key is created, the authentication and acknowledgement message steps of encryption and decryption at each device that are performed upon an initial enrollment can be omitted upon subsequent enrollments.

Figure 3:
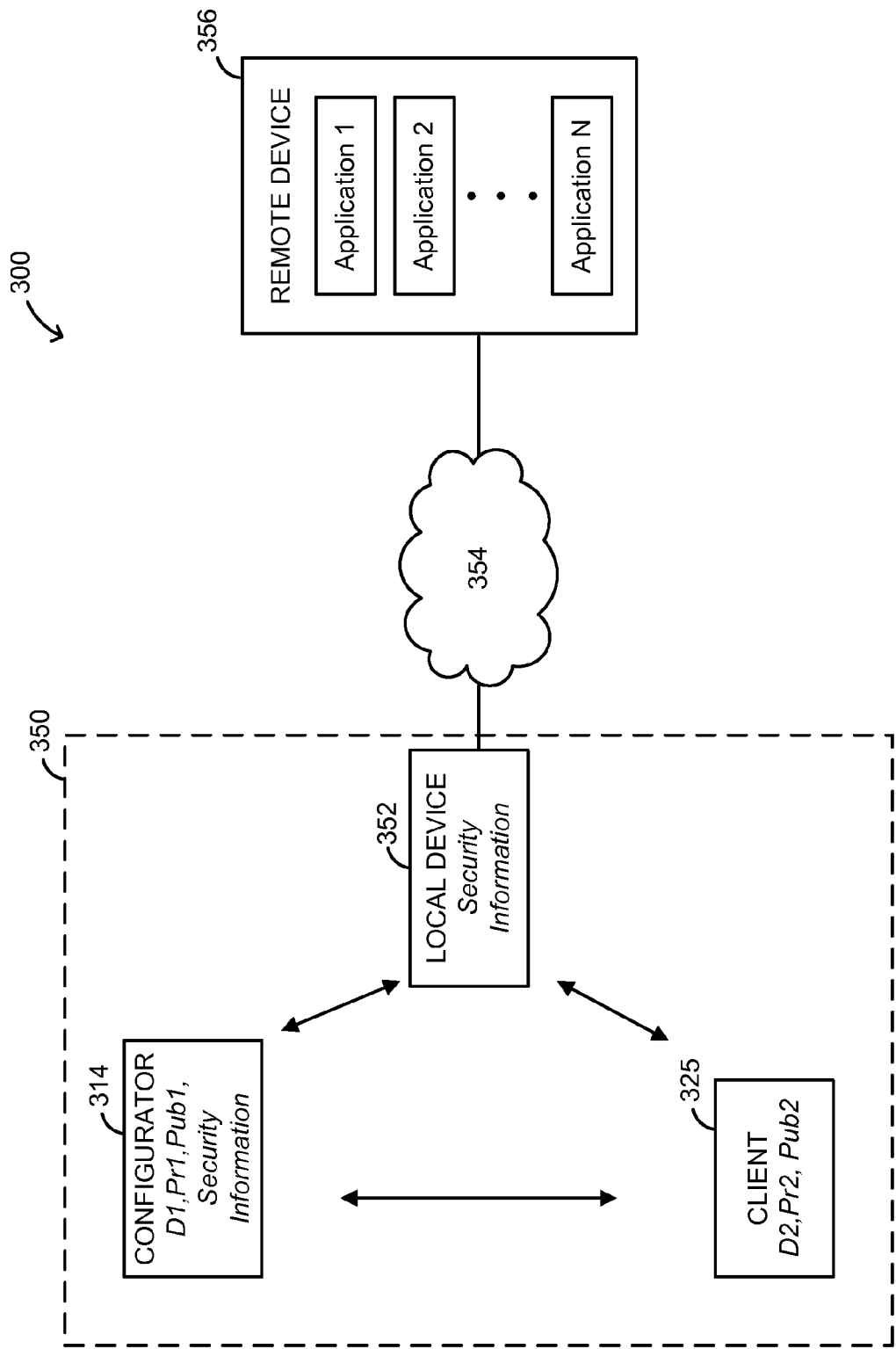
FIG. 3 is a block diagram of an example network 300, according to an embodiment.

FIG. 3 is a block diagram of an example network 300, according to an embodiment.

Network 300 includes a configurator 314, a client 325, a local device 352, and a remote device 356. Network 300 includes two networks 350 and 354. Network 350 can include any of configurator 314, client 325, and local device 352.

In some embodiments, configurator 314 is implemented as configurator 14, as shown in FIG. 1, or as configurator 214, as shown in FIG. 2. In accordance with some embodiments, client 325 is implemented as client 25, as shown in FIG. 1, or as client 225, as shown in FIG. 2. In accordance with other embodiments, configurator 314 is implemented as having the same or substantially the same structure as client 225, as shown in FIG. 2, or any suitable combination of elements from configurator 214 and client 225, as shown in FIG. 2. In accordance with other embodiments, client 325 is implemented as having the same or substantially the same structure as configurator 214, as shown in FIG. 2, or any suitable combination of elements from configurator 214 and client 225, as shown in FIG. 2. For example, although labeled as a configurator, configurator 314 could include a reader, user interface, and/or tag. Similarly, although labeled as a client, client 325 could also include a tag.

In some embodiments, network 354 includes one or more of local device 352, remote device 356, and other devices (not shown) included in network 350. Network 354 includes any suitable number of nodes, additional wired and/or wireless networks, etc., in various embodiments. For example, in an embodiment, network 354 is implemented as a local area network (LAN), or a suitable combination of local and/or external network connections. In various embodiments, network 354 provides local device 352 connectivity to network services, such as Internet services and/or access to remote device 356. Although one remote device 356 is shown in FIG. 3, network 354 includes connections to any suitable number of remote devices, servers, nodes, terminals, etc.

Remote device 356 is communicatively connected to network 354 and forms a part of network 354, in an embodiment. Remote device 356 is configured to run applications 1 though N, where N is a suitable positive integer. In various embodiments, remote device 356 is a server (e.g., a web-based "cloud" server), another configurator device, another client device, a personal computer, a laptop, etc. As an illustrative example, remote device 356 is a cloud-based server that receives data from local device 352, and provides offloaded processing by running an appropriate application based on the data received, and returning data to local device 352 via network 354, in an embodiment.

In an embodiment, local device 352 is configured to allow access for one or more other devices in network 350 to network 354 and/or to remote server 356. For example, local device 352 can be implemented as an AP, as another configurator 314, as another client 325, as a server, a gateway, etc.

In accordance with an embodiment, configurator 314 enrolls client device 325 into network 354 by first enrolling client 325 into network 350. In other words, configurator 314, local device 352, and client 325 are each configured to communicate with one another. However, client 325 may not initially have access to network 354, and/or to remote device 356 until it is enrolled into network 354. Therefore, in accordance with an embodiment, configurator 314 and local device 352 initially form network 350. In an embodiment, local device 352 allows configurator 314 to communicate with network 354. In other embodiments, local device 352 initially communicates with configurator 314 but does not allow configurator 314 access to network 354. Configurator 314 does not have access to network 354 when, for example, local device 352 communicates with configurator 314 using a different RAT than local device 352 uses for communications with network 354, in an embodiment. As an illustrative example, local device 352 and configurator 314 communicate with one another via a personal area network (PAN), while local device 352 communicates with network 354 via a local area network (LAN), in an embodiment.

In an embodiment, client 325 is first enrolled into network 350 by communicating with configurator 314, which is already enrolled in network 350. For example, a user of configurator 314 enters device ID D2 associated with client 325 at configurator 314. As previously discussed with respect to FIG. 2, client 325 represents its device ID D2 on a printed label, as an encoded image, a tag attached to client, etc., in various embodiments. A user enters device ID D2 into configurator 314 using any suitable method, such using a method as previously discussed with regard to FIG. 2, such as bar code scanning, manually typing, tapping configurator 314 to client 325 to read the device ID D2 via a tag, etc.

Once configurator 314 obtains device ID 2, configurator 314 and client 325 exchange public keys Pub1 and Pub2, create a common session key, and configurator 314 authenticates client 325 via any suitable authentication procedure, such as those previously discussed with respect to FIG. 2, for example. In an embodiment, once client 325 is authenticated, configurator 314 sends a notification message to client 325 and the device ID D2. Client 325 then verifies that the device ID D2, previously entered at configurator 314, corresponds to the device ID D2 at client 325. Based on the relationship between D2 and Pub2, client 325 uses a suitable comparison technique, such as those discussed with respect to the verification performed at configurator 214, as shown in FIG. 2, for example, to determine whether the device ID D2 entered at configurator 314 is correct.

If client 325 determines that device ID D2 entered at configurator 314 is correct, then various embodiments include client 325 issuing a notification to configurator 314 that the device ID entered at configurator 314 is correct. In accordance with such an embodiment, configurator 314 sends the security information to client 325 in response to this notification. In accordance with other embodiments, configurator 314 sends the security information to client 325 once the authentication is verified, and client 325 uses the security information for enrollment only when it verifies that the device ID D2 entered at configurator 314 is correct. In this way, client 325 protects itself from enrolling in a network via a spoofed configurator. At this point, client 325 is enrolled in network 350 including configurator 314, but not necessarily enrolled as part of network 354.

Once client 325 is enrolled as part of network 350, various embodiments include configurator 314 authorizing local device 352 to then enroll client 325 into network 354. In other words, once configurator 314 authenticates client 325 and determines that device ID D2 entered at the configurator 314 is correct, configurator 314 can authorize client 325 for network 354 by informing local device 352 that client 325 has been authenticated and is now a trusted device. In an embodiment, local device 352 then sends client 325 security information corresponding to network 354, which client 325 uses to enroll in network 354.

In various embodiments, configurator 314 and/or local device 352 keeps track of any devices that may or may not be allowed access to network 350 and/or network 354, respectively as part of an access control list, a blacklist, etc. In accordance with such embodiments, configurator 314 and/or local device 352 only allows client 325 to enroll as part of network 350 and/or network 354 once it is confirmed that client 325 is on an inclusive access list, is not on an exclusive blacklist, etc. Further in accordance with such embodiments, configurator 314 and/or local device 352 uses its respective access control list to eliminate authentication and authorization procedures upon re-enrollment of client 325. For example, as previously discussed with reference to FIG. 2, configurator 314 can access its control list to verify that client 325 has been previously authenticated and/or authorized (i.e., using the Pub2, D2, a session key, etc.) and therefore skip the authentication procedure upon re-enrollment of client 325.

In an embodiment, local device 352 maintains these access control lists and/or blacklists which are generated and/or updated by respective controllers of respective devices. For example, an access control list could be updated after a specific device fails to be authorized after a number of times or after a certain number of failures are accrued with in a suitable time period. In another embodiment, the access control lists and/or blacklists are entered by a network administrator. Since public keys are much more difficult to copy as opposed to a MAC ID, embodiments incorporating public keys and/or device IDs within an access control list provide an additional level of security. In accordance with an embodiment, local device 352 does not allow devices not on the access control list (or devices that are blacklisted) to enroll into network 354 regardless of authorizations received from configurator 314.

In various embodiments, additional clients may be enrolled into network 354 via a signature chain implementation. For example, once local device 352 enrolls client 325, a signature chain can be formed between local device 352, configurator 314, client 325, and a new client to be enrolled. As will be appreciated by those of skill in the art, any suitable signature chain method may be utilized to enroll another client device, such as the X.509 certificate chain model, etc.

In various embodiments, local device 352 and/or configurator 314 are configured to assign one or more permissions to client 325 upon enrollment. In various embodiments, such permissions are application-based, service-based, etc. For example, based on the identity of client 325, local device 352 enrolls client 325 in network 354 but limits access of client 325 to a subset of applications, services, etc., provided by network 354, in some embodiments and/or scenarios. As an illustrative example, once client 325 is enrolled into network 354, local device 352 allows access of client 325 to application 1 but not application 2. Such embodiments are useful, for example, when only limited network access is needed by client 325, and/or if it is preferable to prevent client 325 from accessing one or more secure applications (e.g., payroll applications, administrator applications, etc.). As another example, permissions provided to client 325 can be service-based. As an illustrative example, if client 325 is implemented as a speaker and configurator 314 is implemented as a smartphone, then local device 352 enrolls client 325 into network 354 but only provides client 325 with audio and network connectivity permissions and audio service permissions, in an embodiment. In an embodiment, the permissions provided to a newly enrolled client are controlled via the security information provided by local device 352, which can be adjusted based on each client requesting enrollment. In this way, local device 352 can tailor the permissions provided to different clients based on each respective clients' configuration.

Figure 4:
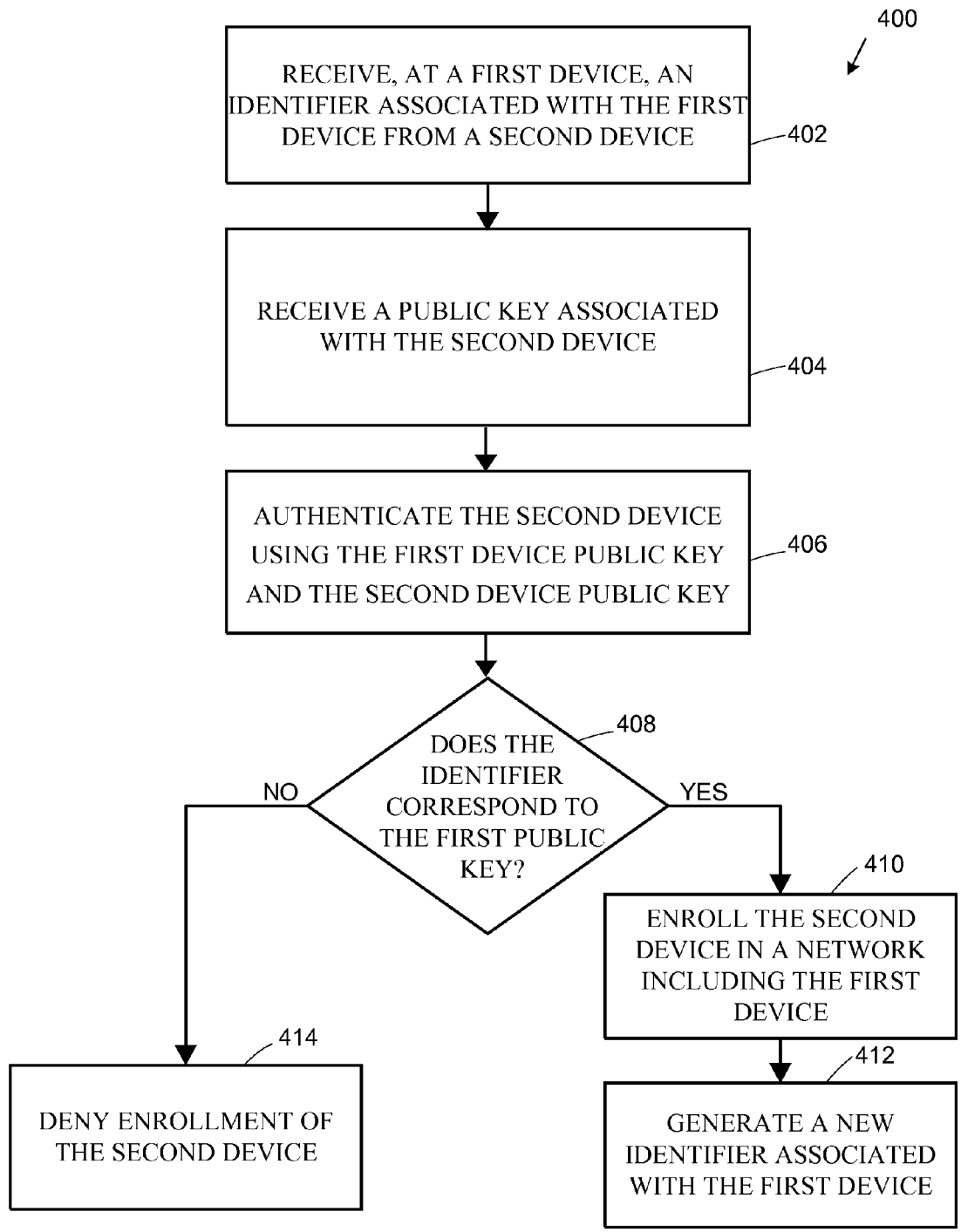
FIG. 4 illustrates an example enrollment method 400, according to an embodiment.

FIG. 4 is a flow diagram of an example enrollment method 400, according to an embodiment. In an embodiment, method 400 is implemented by a configurator device, such as configurator 14 and configurator 214, as shown in FIGS. 1 and 2. In other embodiments, method 400 is implemented by both a configurator and a client device, such as client device 25 or client device 225, as shown in FIGS. 1 and 2.

At block 402, an identifier associated with a first device is received at a first device from a second device. The first device includes, for example, configurator 14 or configurator 214, as shown in FIGS. 1 and 2, respectively, in some embodiments. The second device includes, for example, client device 25 or client device 225, as shown in FIGS. 1 and 2, respectively, in some embodiments. The identifier includes a device identifier based on a public key of the first device, in an embodiment.

At block 404, the first device receives a public key associated with the second device. The public key includes, for example, the public key associated with the client device, as shown in FIGS. 1 and 2, in some embodiments.

At block 406, the first device authenticates the second device using the public keys corresponding to the first device and the second device. The authentication includes, for example, creating a common session key, an exchange of authentication messages between the devices, and a verification at the first and/or second device that the encrypted authentication messages are properly decrypted using a respective private key at the first and the second device, in an embodiment.

At block 408, the first device determines whether the received device identifier is correct. For example, block 408 includes the first device regenerating a device identifier from the public key and comparing the regenerated device identifier with the received device identifier to determine if they match. If the received identifier is correct, then method 400 continues to block 410. On the other hand, if the received identifier is not correct, method 400 continues to block 414.

At block 410, the first device enrolls the second device in a network including the first device. Enrolling the second device in the network includes, for example, sending the security information pertaining to the network to the second device, which the second device then uses to enroll in the network.

In an embodiment, block 412 includes generating a new identifier associated with the first device. Block 412 includes, for example, controller 215 generating a new device ID by applying a different, or modified, algorithm on its public key. In another embodiment, the first device does not change its device ID after enrollment, and block 412 is omitted.

At block 414, the first device denies enrollment of the second device. In an embodiment, block 414 includes recording the public key, device identifier, and/or session key of the denied second device in an access control list that can be accessed later to track, for example, how many unsuccessful enrollment attempts are made by the second device.

Figure 5:
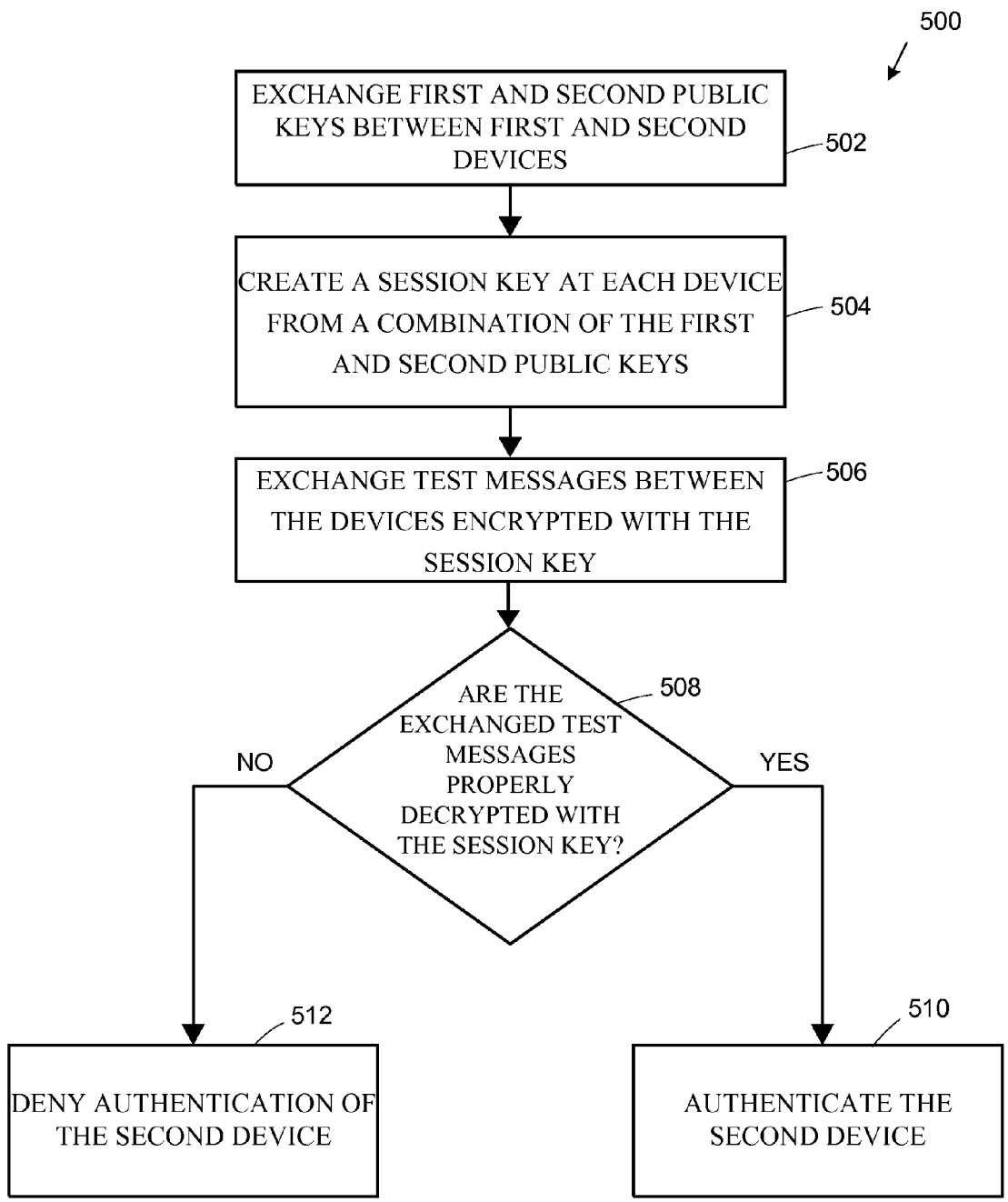
FIG. 5 illustrates an example authorization method 500, according to an embodiment.

FIG. 5 is a flow diagram of an example authentication method 500, according to an embodiment. In an embodiment, method 500 is an implementation of block 406, as shown in FIG. 4.

At block 502, the first device and the second device exchange public keys with one another so that the first device and the second device each has the others public key. Block 502 includes, for example, configurator 14 or configurator 214, as shown in FIGS. 1 and 2, sending its public key to, and receiving the public key of, client device 25 or client device 225, as shown in FIGS. 1 and 2, respectively, in some embodiments.

At block 504, each of the first device and the second device creates a common session key based on a combination of the first and second public keys. In an embodiment, this session key is created based on a Diffie-Hellman key exchange.

At block 506, the first and second devices exchange test messages with one another so that each of the first device and the second device can authenticate one another. Block 506 includes, for example, authentication and acknowledgement messages exchanged between a configurator and client device, as shown in FIGS. 1 and 2, in an embodiment.

At block 508, the first device and the second device determine if the test messages are properly decrypted with the session key and a private key of each respective device. Block 508 includes, for example, client device 25 or client device 225, as shown in FIGS. 1 and 2, sending an encrypted authorization message to configurator 14 or configurator 214, as shown in FIGS. 1 and 2, respectively, in an embodiment. In an embodiment, block 508 includes the configurator device decrypting the authentication message and sending an encrypted acknowledgement message to the client, which the client device attempts to decrypt and match to a predetermined message format. If the configurator and/or client device determine that the decrypted authorization/acknowledgment messages are correct, then method 500 continues to block 510. If the configurator and/or client device determine that the decrypted authorization/acknowledgment messages are not correct, method 500 continues to block 512.

At block 510, the second device is authenticated. Block 510 includes, for example, the first device sending a notification to the second device that the first device has authenticated the second device. In an embodiment, block 510 includes updating an access control list with a device ID, public key, or session key corresponding to indicate that the second device is authenticated.

At block 512, the second device is denied authentication. In an embodiment, block 512 includes updating an access control list with the device ID, public key, or session key corresponding to the second device to indicate that the second device has been denied authorization.

Figure 6:
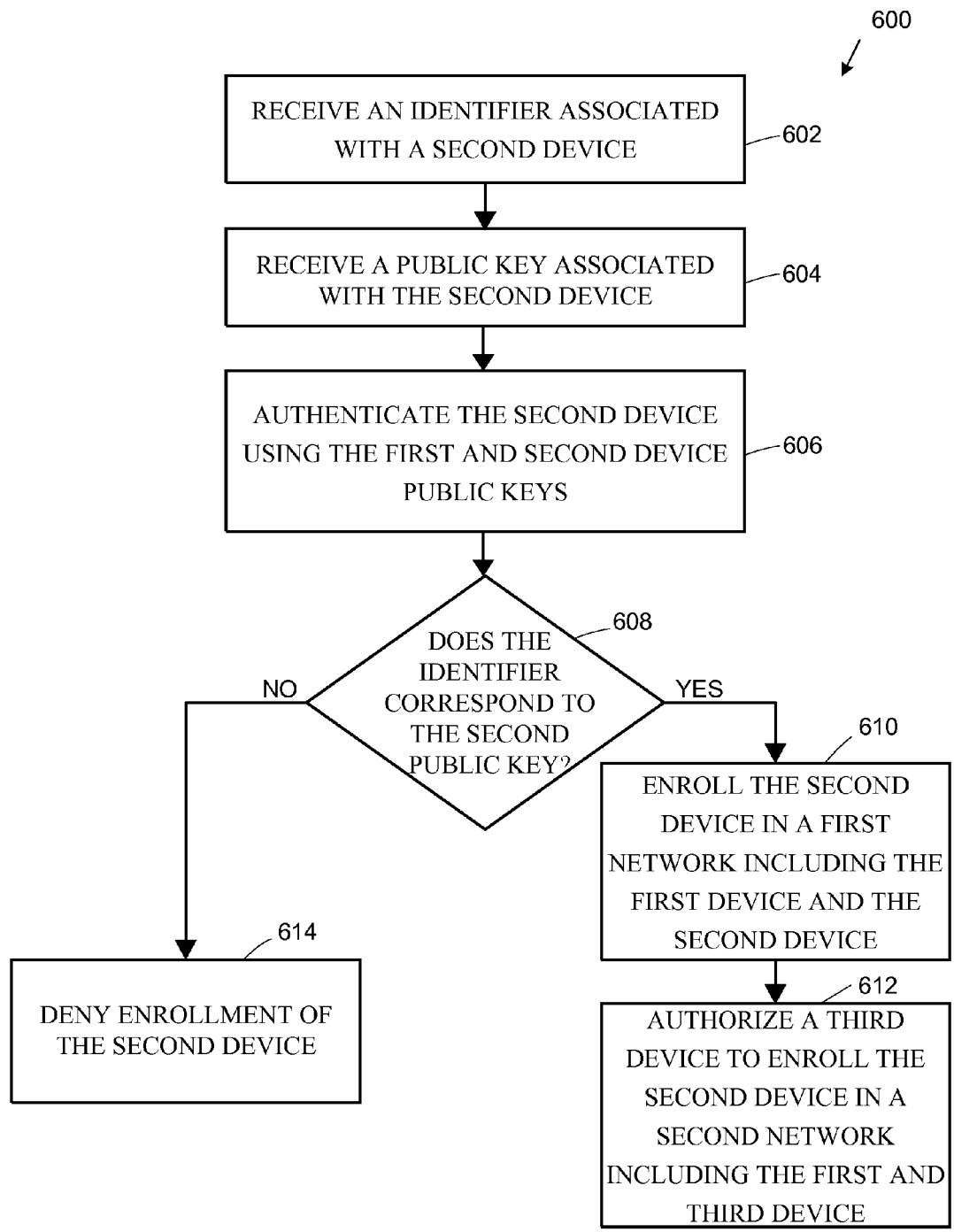
FIG. 6 illustrates an example enrollment method 600, according to an embodiment.

FIG. 6 is a flow diagram of an example enrollment method 600, according to an embodiment. In an embodiment, method 600 is implemented by a configurator device, such as configurator 314, as shown in FIG. 3. In another embodiment, method 600 is implemented by a client device, such as client 325, as shown in FIG. 3.

At block 602, a first device receives an identifier associated with a second device. The first device includes, for example, configurator 314, as shown in FIG. 3, in an embodiment. The second device includes, for example, client 325, as shown in FIG. 3, in an embodiment. The identifier includes, for example, the device identifier associated with the second device, in an embodiment. Receiving the identifier includes, for example, scanning an encoded image of the identifier, entering an alphanumeric representation of the identifier, tapping the first device to the second device to read the identifier via a tag, etc., according to various embodiments.

At block 604, the first device receives a public key associated with the second device. Receiving the public key includes, for example, a configurator receiving the public key from a client in accordance with a communication protocol, in an embodiment.

At block 606, the first device authenticates the second device. Block 606 includes, for example, creation of a session key at the first device and second device, in an embodiment. In an embodiment, block 606 includes an exchange of messages between the first device and the second device encrypted with the session key and then decrypted at the receiving device with the respective private key of the receiving device. In an embodiment, the session key is created based on a Diffie-Hellman key exchange. In other embodiments, the session key is created using another suitable technique.

At block 608, the second device determines whether the device identifier entered at the first device corresponds to the public key associated with the second device. In an embodiment, the second device receives a confirmation that authentication has succeeded from the first device together with the device identifier entered at the first device. The second device can then verify whether the device identifier received from the first device matches the device identifier of the second device, in an embodiment. For example, the second device regenerates the device ID by rerunning a hashing algorithm on the public key associated with the second device, and then compares the received device identifier to the regenerated device identifier, in an embodiment. If the second device determines that the device identifier received from the first device identifier is correct, then method 600 continues to block 610. Otherwise, method 600 continues to block 614.

At block 610, the first device enrolls the second device into a first network including the first device and the second device. In an embodiment, the second device sends an acknowledgement message to the first device indicating that the device identifier received from the first device is correct. Further in accordance with an embodiment, the first device then sends the second device security information corresponding to the first network, which the second device can use to complete the enrollment process.

At block 612, the first device sends an authorization to a third device to enroll the second device in a second network including the third device and the first device. This third device includes, for example, local device 356, as shown in FIG. 3, in an embodiment. Block 612 includes, for example, the first device sending a confirmation that the second device is authorized and/or a copy of the device identifier corresponding to the second device. In various embodiments, the third device further decides whether to enroll the second device in the second network based on access control lists, blacklists, administrative rules, etc.

At block 614, the second device is denied enrollment. In an embodiment, the second device sends a notification message to the first device that the device identifier entered at the first device is incorrect. In an embodiment, block 614 includes the first and/or second device recording the public key, session key, and/or device identifier of the second device to create an access control list.

The Figures presented herein are for illustrative purposes. Communications and/or couplings between various elements illustrated throughout the Figures may be performed using any type of coupling or means of communications to accomplish the corresponding operations as described herein. For example, even though single lines are used to illustrate communications between some elements, this communication may be implemented with any number of wires and/or buses. Furthermore, such communications may be implemented with any appropriate communication protocol, such as serial or parallel communications, regardless of the illustrated couplings.

Further aspects of this invention relate to one or more of the following clauses.

In a first embodiment, a first device having a first public key receives an identifier associated with the first device from a second device, and a second public key associated with the second device. The first embodiment further includes the first device authenticating the second device using the first public key and the second public key, determining whether the identifier received from the second device corresponds to the first public key, and enrolling the second device in a network including the first device based on the first device determining that the identifier received from the second device corresponds to the first public key.

Variations of the first and other embodiments include the first device authenticating the second device by generating a session key based on the first public key and the second public key, sending a first message encrypted with the session key to the second device, and receiving a second message sent from the second device in response to the first message being successfully decrypted at the second device with the session key.

Additional variations of the first and other embodiments include the first device authenticating the second device by encrypting the second message and verifying that the decrypted message conforms to a predetermined message format.

Furthermore, variations of the first and other embodiments include the first device determining whether the identifier received from the second device corresponds to the first public key by applying a hash function to the first public key to provide a regenerated identifier and comparing the regenerated identifier with the identifier received from the second device.

In addition, variations of the first and other embodiments include the second device capturing an image representative of the identifier, and wherein the act of receiving the identifier at the first device includes receiving the identifier from the second device based on the image.

Further, variations of the first and other embodiments include the first device determining whether the identifier received from the second device corresponds to the first public key by rehashing the first public key to provide a rehashed first public key and determining whether the identifier maps to the rehashed first public key.

Still further, variations of the first and other embodiments include the first device sending security information to the second device to facilitate the enrollment of the second device in the network based on determining that the identifier received from the second device corresponds to the first public key.

Additionally, variations of the first and other embodiments include the first device updating the identifier after the second device is enrolled in the network to facilitate subsequent enrollment of a third device.

In a second embodiment, a first device includes a network interface configured to receive (i) an identifier associated with the first device, the identifier received from a second device, and (ii) a second public key associated with the second device and a controller. The second embodiment further includes the controller being configured to (i) authenticate the second device using a first public key associated with the first device and the second public key, (ii) determine whether the identifier received from the second device corresponds to the first public key, and (iii) enroll the second device in a network including the first device based on based on determining that the identifier received from the second device corresponds to the first public key.

Variations of the second and other embodiments include the controller being further configured to generate a session key based on a combination of the first public key and the second public key, and the network interface being further configured to (i) send a first message encrypted with the session key to the second device, and (ii) receive a second message, sent from the second device, in response to the first message being successfully decrypted at the second device with the session key.

In addition, variations of the second and other embodiments include the controller being further configured to (i) decrypt the second message, and (ii) verify that the decrypted message conforms to a predetermined message format.

Furthermore, variations of the second and other embodiments include the controller being further configured to apply a hash function to the first public key to provide a regenerated identifier, and to compare the regenerated identifier with the identifier received from the second device.

Further, variations of the second and other embodiments include the second device including an image capture device configured to capture an image representative of the identifier, and the network interface being further configured to receive the identifier based on the image.

Still further, variations of the second and other embodiments include the controller being further configured to (i) rehash the first public key to provide a rehashed first public key, and (ii) determine whether the identifier maps to the rehashed first public key.

Additionally, variations of the second and other embodiments include the network interface being further configured to send network security information to the second device to facilitate the enrollment of the second device in the network based on determining that the identifier corresponds to the first public key.

In addition, variations of the second and other embodiments include the controller being further configured to update the identifier with another value after the second device is enrolled in the network to facilitate subsequent enrollment of a third device.

In a third embodiment, a first device having a first public key receives an identifier associated with a second device and a second public key associated with the second device. Furthermore, the third embodiment includes the first device sending the identifier to the second device, authenticating the second device using the first public key and the second public key, and receiving a notification from the second device that the identifier sent to the second device corresponds to the second public key. Finally, the third embodiment includes the first device enrolling the second device in a first network including the first device based on receiving the notification, and authorizing a third device to enroll the second device in a second network including the first device and the third device after the second device is enrolled in the first network.

Variations of the third and other embodiments include the first device authorizing the third device by sending a message to the third device to indicate to the third device that the second device has been authenticated.

Furthermore, variations of the third and other embodiments include the third device enrolling the second device in the second network having a plurality of network permissions.

In addition, variations of the third and other embodiments include the second network including a fourth device configured to run a plurality of applications, and the third device enrolling the second device in the second network with a plurality of application permissions specifying which applications the second device is allowed to access.

Still further, variations of the third and other embodiments include the fourth device being a server.

Additionally, variations of the third and other embodiments include the first device modifying an access control list based on whether the second device is authenticated, and the first device allowing only devices in the access control list to access the first network.

Additional variations of the third and other embodiments include the first device modifying the access control list by adding an indication of the second device to the access control list when the second device is enrolled in the first network.

Furthermore, variations of the third and other embodiments include the third device modifying an access control list based on whether the second device is enrolled in the second network, the third device allowing only devices in the access control list to access the second network.

Additional variations of the third and other embodiments include the third device modifying the access control list by adding an indication of the second device to the access control list when the second device is enrolled in the second network.

Furthermore, variations of the third and other embodiments include the first device sending security information to the second device to facilitate the enrollment of the second device in the first network based on receiving the notification from the second device.

Still further, variations of the third and other embodiments include the second device updating the identifier with another value after the second device is enrolled in the second network to facilitate subsequent enrollment of a third device.

At least some of the various blocks, operations, and techniques described above may be implemented utilizing hardware, one or more processors executing firmware instructions, one or more processors executing software instructions, or any combination thereof. When implemented utilizing one or more processors executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the one or more processors, cause the one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, comprising:
    receiving, at a first device having a first public key, an identifier associated with the first device, the identifier received from a second device;
    receiving, at the first device, a second public key associated with the second device;
    generating, at the first device, a session key based on a combination of the first public key and the second public key;
    authenticating, at the first device, the second device using the session key;
    determining, at the first device, whether the identifier received from the second device corresponds to the first public key; and
    enrolling, using the first device, the second device in a network including the first device based on determining that the identifier received from the second device corresponds to the first public key.

2. The method of claim 1, wherein authenticating the second device comprises:
    sending, by the first device, a first message encrypted with the session key to the second device; and
    receiving, at the first device, a second message sent from the second device in response to the first message being successfully decrypted at the second device with the session key.

3. The method of claim 2, wherein authenticating the second device further comprises:
    decrypting the second message; and
    verifying that the decrypted message conforms to a predetermined message format.

4. The method of claim 1, wherein determining whether the identifier received from the second device corresponds to the first public key comprises:
    applying, at the first device, a hash function to the first public key to provide a regenerated identifier; and
    comparing, at the first device, the regenerated identifier with the identifier received from the second device.

5. The method of claim 1, further comprising:
    capturing, at the second device, an image representative of the identifier, and wherein the act of receiving the identifier comprises:
    receiving, at the first device, the identifier from the second device based on the image.

6. The method of claim 1, wherein determining whether the identifier received from the second device corresponds to the first public key comprises:
    rehashing the first public key to provide a rehashed first public key; and
    determining whether the identifier maps to the rehashed first public key.

7. The method of claim 1, further comprising:
    sending, by the first device, security information to the second device to facilitate the enrollment of the second device in the network based on determining that the identifier received from the second device corresponds to the first public key.

8. The method of claim 1, further comprising:
    updating, by the first device, the identifier after the second device is enrolled in the network to facilitate subsequent enrollment of a third device.

9. A first device, comprising:
    a network interface configured to receive (i) an identifier associated with the first device, the identifier received from a second device, and (ii) a second public key associated with the second device; and a controller configured to:
(i) generate a session key based on a combination of a first public key associated with the first device and the second public key,
(ii) authenticate the second device using the session key;
(iii) determine whether the identifier received from the second device corresponds to the first public key, and
(iv) enroll the second device in a network including the first device based on based on determining that the identifier received from the second device corresponds to the first public key.

10. The first device of claim 9, wherein:
the network interface is further configured to (i) send a first message encrypted with the session key to the second device, and (ii) receive a second message, sent from the second device, in response to the first message being successfully decrypted at the second device with the session key.

11. The first device of claim 9, wherein the controller is further configured to (i) decrypt the second message, and (ii) verify that the decrypted message conforms to a predetermined message format.

12. The first device of claim 9, wherein the controller is further configured to:

apply a hash function to the first public key to provide a regenerated identifier; and
compare the regenerated identifier with the identifier received from the second device.

13. The first device of claim 9, wherein the second device includes an image capture device configured to capture an image representative of the identifier, and wherein the network interface is further configured to receive the identifier based on the image.

14. The first device of claim 9, wherein the controller is further configured to (i) rehash the first public key to provide a rehashed first public key, and (ii) determine whether the identifier maps to the rehashed first public key.

15. The first device of claim 9, wherein the network interface is further configured to send network security information to the second device to facilitate the enrollment of the second device in the network based on determining that the identifier corresponds to the first public key.

16. The first device of claim 9, wherein the controller is further configured to update the identifier with another value after the second device is enrolled in the network to facilitate subsequent enrollment of a third device.

* * * * *